July 4, 1939.  F. HUTH  2,164,744

BLADE MOUNTING FOR AIRCRAFT

Filed Aug. 28, 1936　　2 Sheets-Sheet 1

Inventor:
Fritz Huth
by Frank Reichard
Attorney.

July 4, 1939.　　　　F. HUTH　　　　2,164,744

BLADE MOUNTING FOR AIRCRAFT

Filed Aug. 28, 1936　　　2 Sheets-Sheet 2

Inventor:
Fritz Huth
by
Franz Reinhold
Attorney.

Patented July 4, 1939

2,164,744

UNITED STATES PATENT OFFICE 2,164,744

BLADE MOUNTING FOR AIRCRAFT

Fritz Huth, Berlin-Johannisthal, Germany

Application August 28, 1936, Serial No. 98,361
In Germany January 29, 1934

1 Claim. (Cl. 170—173)

My invention relates to improvements in the blade mounting for the propellers of aircraft. As is known in the art, the vibrations of the motor of the aircraft are transmitted to the blades of the propeller and they have an exceedingly injurious effect thereon, particularly in view of the thickness of the blades which in view of the efficiency in operation and the gravity is reduced as far as possible. The object of the improvements is to avoid this injurious effect and with this object in view my invention consists in providing, between the driving shaft and the propeller blades, a body which is adapted to dampen the vibrations transmitted from the motor to the blades, the said dampening body transmitting the power from the motor to the blades without simultaneously transmitting the vibrations.

I have found that the best results are attained when the said dampening body is made from certain artificial materials, such as a composition of fabric or other fiber material and artificial resin, caoutchouc, and similar materials, the preferred material being a composition of fabric or fiber material and a phenolic condensation product.

Figure 3:
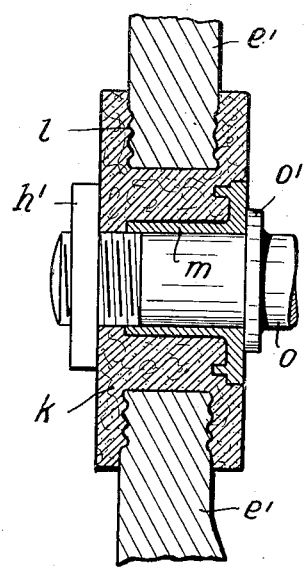
Figure 4:
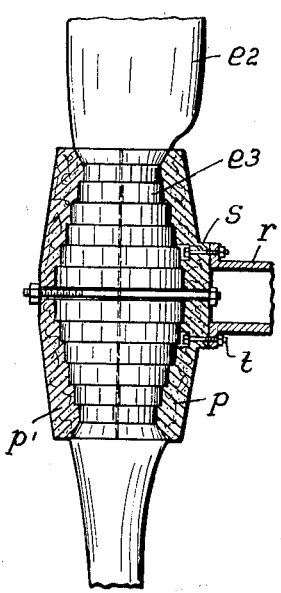
Figure 5:
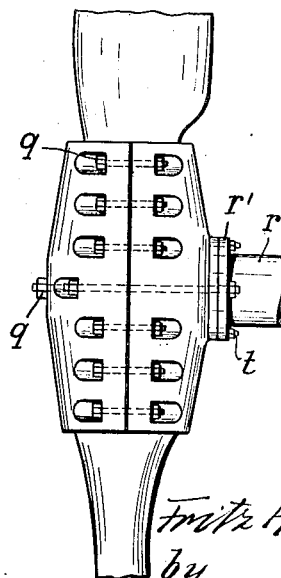

For the purpose of explaining the invention several examples embodying the same have been shown in the accompanying drawings in which the same reference characters have been used in all the views to indicate corresponding parts. In said drawings Fig. 1 is a diagrammatical elevation showing a part of an aircraft, the motor, the propeller shaft, and the propeller, Fig. 2 is a fragmentary elevation partly in section showing the driving shaft, a part of the blades, and the dampening body interposed between the said parts, Figs. 3 and 4 are similar sectional elevations showing modifications, and Fig. 5 is an elevation of Fig. 4.

Figure 1:
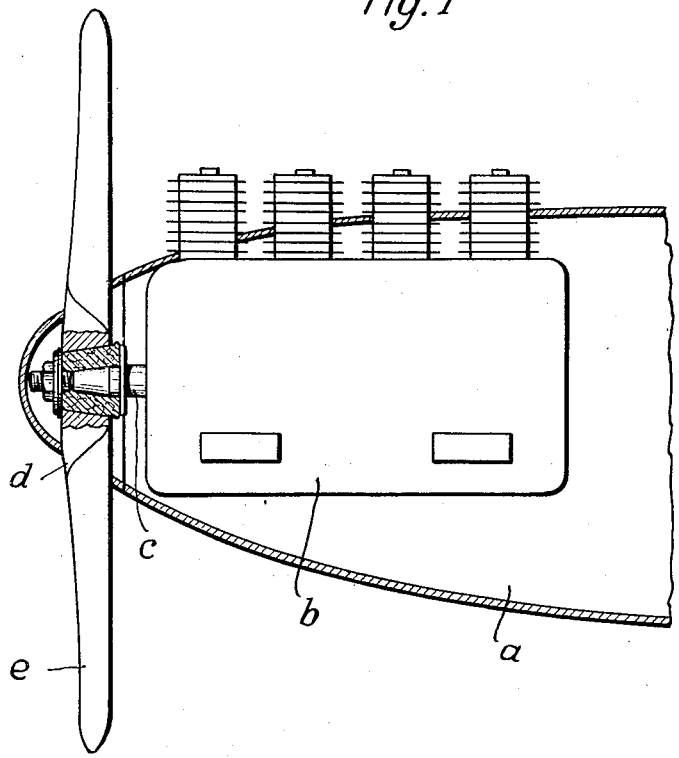

In Fig. 1 I have showing the body $a$ of an aircraft, the motor $b$, the propeller shaft $c$, and the propeller $d$.

Figure 2:
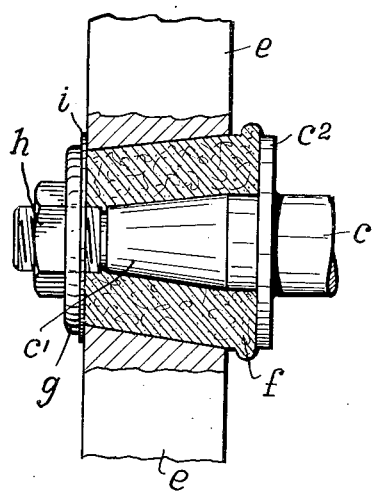

In Fig. 2 I have shown the connection of the propeller shaft $c$ with the blades $e$ of the propeller. On the tapering end $c'$ of the propeller shaft $a$ conical sleeve $f$ is mounted, which is fixed in position by means of a washer $g$ and a nut $h$ pressing the sleeve on a flange $c^2$ of the propeller shaft. As shown in Fig. 1, the blades $e$ are made integral and they are fixed in position on the conical outer surface of the sleeve $f$ by means of the nut $h$ and the washer $g$.

The sleeve $f$ is made from a material having high dampening property, and preferably it is made from a suitable artificial material such as a composition of fabric or fiber material and artificial resin, caoutchouc and the like, the preferred material being a composition of fabric or fiber material and a phenolic condensation product. I have found that such materials are adapted, by reason of their strength, to transmit high power, and that by reason of their dampening property the vibrations of the engine are not transmitted to the blades $e$.

In order to prevent transmission of the vibrations through the tapering end $c'$ of the propeller shaft, the nut $h$ and the washer $g$, I prefer to place a disk $i$ of a similar dampening material between the said washer and the blades $e$.

In Fig. 3 I have shown a modification in which separate blades $e'$ are provided, which are fixed to a hub $k$ secured to the propeller shaft $o$. The hub $k$ is likewise made from one of the aforesaid artificial materials which are adapted to dampen vibrations, and the blades $e'$ are fixed within the said hub by being pressed therein in the course of the manufacture of the hub, the roots of the said blades being preferably corrugated as is shown at $z$.

The hub $k$ is fixed to the propeller shaft by means of a nut $h'$ and a collar $o^1$, and I prefer to provide the hub $k$ with a metal sleeve $m$.

In the modification shown in Figs. 4 and 5, the stems of the blades $e^2$ are provided with flaring bases $e^3$ having stepped shoulders, which are embedded in a tubular hub made in two sections $p$ and $p'$ connected with each other by screws $q$. Preferably the roots $e^3$ are fixed in position by the clamping action of the said screws. The section $p$ of the hub is fixed to the tubular propeller shaft $r$. As shown the said shaft is formed with a flange $r^1$ which bears on a pad $s$ formed on the section $p$, and it is fixed in position by means of screws $t$.

The sections $p$ and $p^1$ forming the hub are made from the aforesaid dampening material.

I claim:

Driving mechanism for aircraft including the combination of a rotatable power shaft, a propeller blade, a power transmitting body of vibration-damping material interposed between shaft and blade, said body being formed in two separable parts adapted to close upon the blade, said body being borne by the shaft and itself carrying the blade, and clamping means securing the blade between the separable parts of the body and also securing the body to the shaft.

FRITZ HUTH.